United States Patent
Coughlan et al.

(10) Patent No.: US 8,165,282 B1
(45) Date of Patent: Apr. 24, 2012

(54) EXPLOITING FACIAL CHARACTERISTICS FOR IMPROVED AGENT SELECTION

(75) Inventors: Marc William Joseph Coughlan, Sydney (AU); Alexander Quentin Forbes, Westleigh (AU); Peter D. Runcie, Bilgola Plateau (AU); Ralph Warta, Lane Cove (AU)

(73) Assignee: Avaya Inc., Basking Ridge, NJ (US)

( * ) Notice: Subject to any disclaimer, the term of this patent is extended or adjusted under 35 U.S.C. 154(b) by 1526 days.

(21) Appl. No.: 11/513,487

(22) Filed: Aug. 30, 2006

Related U.S. Application Data (60) Provisional application No. 60/808,910, filed on May 25, 2006.

(51) Int. Cl.
*H04M 5/00* (2006.01)

(52) U.S. Cl. .................................. 379/265.11

(58) Field of Classification Search ................. 379/265.01–265.12; 348/14.06, 348/14.01–14.03, 14.08–14.1; 375/240.24; 345/473–474; 370/352; 715/708
See application file for complete search history.

(56) References Cited

U.S. PATENT DOCUMENTS

| | | |
|---|---|---|
| 4,791,660 A | 12/1988 | Oye et al. |
| 5,164,992 A | 11/1992 | Turk et al. |
| 5,206,903 A | 4/1993 | Kohler et al. |
| 5,280,561 A | 1/1994 | Satoh et al. |
| 5,349,379 A | 9/1994 | Eichenlaub |
| 5,359,362 A | 10/1994 | Lewis et al. |
| 5,430,473 A | 7/1995 | Beecher, II et al. |
| 5,506,872 A | 4/1996 | Mohler |
| 5,619,254 A | 4/1997 | McNelley |
| 5,675,376 A | 10/1997 | Andersson et al. |
| 5,731,805 A | 3/1998 | Tognazzini et al. |
| 5,828,747 A | 10/1998 | Fisher et al. |
| 5,839,000 A | 11/1998 | Davis, Jr. et al. |
| RE36,041 E | 1/1999 | Turk et al. |
| 5,905,525 A | 5/1999 | Ishibashi et al. |
| 5,905,793 A | 5/1999 | Flockhart et al. |
| 5,982,873 A | 11/1999 | Flockhart et al. |
| 5,986,703 A | 11/1999 | O'Mahony |
| 6,046,767 A | 4/2000 | Smith |
| 6,163,607 A | 12/2000 | Bogart et al. |
| 6,173,053 B1 | 1/2001 | Bogart et al. |
| 6,192,122 B1 | 2/2001 | Flockhart et al. |
| 6,343,141 B1 | 1/2002 | Okada et al. |
| 6,463,220 B1 | 10/2002 | Dance et al. |
| 6,483,531 B1 | 11/2002 | Ryu |
| 6,496,217 B1 | 12/2002 | Piotrowski |
| 6,498,684 B1 | 12/2002 | Gladnick et al. |
| 6,507,356 B1 * | 1/2003 | Jackel et al. ............... 348/14.06 |

(Continued)

FOREIGN PATENT DOCUMENTS

EP 0118182 9/1984

(Continued)

OTHER PUBLICATIONS

U.S. Appl. No. 10/459,182, Chan.

(Continued)

*Primary Examiner* — Ahmad Matar
*Assistant Examiner* — Oleg Asanbayev
(74) *Attorney, Agent, or Firm* — Sheridan Ross P.C.

(57) ABSTRACT

The present invention, in one embodiment, is directed to a method for servicing customer contacts in a contact center in which customer facial features are employed in selecting and/or configuring contact center resources to service the customer.

11 Claims, 5 Drawing Sheets

U.S. PATENT DOCUMENTS

| | | | |
|---|---|---|---|
| 6,556,196 B1 | 4/2003 | Blanz et al. | |
| 6,593,955 B1 | 7/2003 | Falcon | |
| 6,597,736 B1 | 7/2003 | Fadel | |
| 6,603,491 B2 | 8/2003 | Lemelson et al. | |
| 6,614,783 B1* | 9/2003 | Sonesh et al. | 370/352 |
| 6,657,628 B1* | 12/2003 | Cook | 345/473 |
| 6,680,745 B2 | 1/2004 | Center, Jr. et al. | |
| 6,744,927 B1 | 6/2004 | Kato | |
| 6,753,900 B2 | 6/2004 | Runcie et al. | |
| 6,801,642 B2 | 10/2004 | Gorday et al. | |
| 6,812,956 B2 | 11/2004 | Ferren et al. | |
| 6,864,912 B1 | 3/2005 | Mahaffey et al. | |
| 6,878,924 B2 | 4/2005 | Baron | |
| 7,003,040 B2* | 2/2006 | Yi | 375/240.24 |
| 7,023,464 B1 | 4/2006 | Harada et al. | |
| 7,050,084 B1 | 5/2006 | Lang | |
| 7,085,409 B2 | 8/2006 | Sawhney et al. | |
| 7,091,928 B2 | 8/2006 | Rajasingham | |
| 7,262,788 B2 | 8/2007 | Ono et al. | |
| 7,269,292 B2 | 9/2007 | Steinberg | |
| 7,425,981 B2 | 9/2008 | Kamariotis | |
| 2002/0113662 A1 | 8/2002 | Rathore et al. | |
| 2004/0012613 A1 | 1/2004 | Rast | |
| 2004/0210844 A1* | 10/2004 | Pettinati et al. | 715/708 |
| 2005/0190188 A1* | 9/2005 | Anzawa et al. | 345/474 |
| 2005/0210105 A1 | 9/2005 | Hirata et al. | |
| 2005/0248651 A1 | 11/2005 | Hirata et al. | |
| 2006/0152577 A1* | 7/2006 | Hagendorf et al. | 348/14.01 |
| 2006/0184800 A1* | 8/2006 | Rosenberg | 713/186 |
| 2007/0074114 A1* | 3/2007 | Adjali et al. | 715/706 |
| 2007/0115350 A1* | 5/2007 | Currivan et al. | 348/14.08 |

FOREIGN PATENT DOCUMENTS

| | | |
|---|---|---|
| FR | 2529352 | 12/1983 |
| JP | 401221086 | 9/1989 |
| JP | 404344788 | 12/1992 |
| JP | 05219269 | 8/1993 |
| WO | WO 99/57900 | 11/1999 |
| WO | WO 02/085018 | 10/2002 |

OTHER PUBLICATIONS

U.S. Appl. No. 10/941,199, Beck et al.
U.S. Appl. No. 11/025,493, Beck et al.
Brandstein, Michael, "Real-Time Face Tracking Using Audio and Image Data," Harvard Intelligent Multi-Media Environment Laboratory (HIMMEL) (undated), pp. 1-22.
CDM Optics, "Image Gallery," (2001).
Cisco Systems, Inc., "Cisco VT Advantage Video Telephony Solution," (1992-2004), pp. 1-6.
Digibird.com, "Essential Optics for Digiscoping," (2002), available at http://www.digibird.com/primerdir/primer0.htm, 4 pages.
Eisert, Peter, "Immersive 3-D Video Conferencing: Challenges, Concepts, and Implementations," Proc. SPIE Visual Communications and Image Processing (VCIP), Lagano, Switzerland (Jul. 2003), 11 pages.
Entropy Software Laboratory, "Image Recognition" (undated), available at http://www.entropysoftwarelab.com/technology/imageRecognition.html, 3 pages.
Fintzel et al., "Real Time 3D Navigation in a Static Virtualzied Scene from a Limited Set of 2D Data," IEEE Int'l Conf. on Multimedia & Expo 2000, New York, Electronic Proceedings, 11 pages.
Imagis Technologies Inc. News Release, "Imagis Technologies Releases Major Upgrade to Face Recognition Software," (Sep. 2002).
Jun, Song F. et al., Optical Feature Recognition, (Mar. 6, 1995), 1 page.
Mark et al., "Post-Rendering 3D Warping", In Proceedings of 1997 Symposium on Interactive 3D Graphics, Providence, RI, Apr. 27-30, 1997, pp. 7-16.
Marpe et al., "Video Compression Using Context-Based Adaptive Arithmetic Coding," Proc. IEEE International Conference on Image Processing (ICIP'01), vol. III, pp. 558-561, Oct. 2001.
Nikon MicroscopyU: Interactive Java Tutorials website, "Digital Camera Resolution Requirements for Optical Microscopy," (2000-2004), available at http://www.microscopyu.com/tutorials/java/digitalimaging/pixelcalculator, 4 pages.
Nordic Guide to Video Telephony and Video Relay Service, The Nordic Forum for Telecommunication and Disability 2002, NFTH Mar. 2002, pp. 1-14.
Oshima, Shigeru, "Acquisition: Fundamental Optics of Television Camera Lenses," shortened version of the Fundamental Optics section in Canon Guidebook of Television System Optics (2nd Ed.), (Jan. 2000), 13 pages.
Peter Kauff Projects, "BS-Immersive Media & 3D Video Group," (Ed. Christoph Fehn, Nov. 12, 2002), 6 pages.
Sanyo Electric Co., Ltd., "Character and Image Recognition Technology," Technology R&D Headquarters (2003), available at http://www.sanyo.co.jp/R_and_D/english/theme/c-2.html, 2 pages.
Soongsathitanon, Somphob, et al., University of Newcastle upon Tyne, "A New Orthogonal Logarithmic Search Algorithm for Fixed Block-Based Motion Estimation for Video Coding," date unknown, 4 pages.
Techno World, "Multimedia Cameras for Visual Society: Ultraminiature Multimedia Camera Systems," (undated), 6 pages.
The Imaging Source website, "Introduction to Optics and Lenses," (2003), available at http://www.theimagingsource.com/prod/opt/opticsintro_2.htm, 10 pages.
Toshiba Corporation Press Release, "Toshiba Announces World's First Image Recognition LSI for Intelligent Vehicle System," (Feb. 6, 2001), available at http://www.toshiba.co.jp/about/press/2001_02/pr0602.htm, 3 pages.
Wolberg, George, "Digital Image Warping," IEEE Computer Society Press Monograph (Mar. 4, 2002), available at http://www-cs.ccny.cuny.edu/~wolberg/diw.html, 7 pages.
Cula et al., "Recognition Methods for 3D Textured Surfaces", Proceedings of SPIE conference of Human Vision and Electronic Imaging VI, San Jose, Jan. 2001.
NeuralWare products website entitled "NeuralWorks Predict," (2005), available at http://www.neuralware.com/products.jsp, 6 pages.
TheFreeDictionary.com website entitled, "Neural Network," Farlex Inc. (2004), available at http://encyclopedia.thefreedictionary.com/neural%20network, 6 pages.
TheFreeDictionary.com website entitled, "Feedforward," Farlex Inc. (2004), available at http://encyclopedia.thefreedictionary.com/feedforward, 3 pages.
TheFreeDictionary.com website entitled, "Sigmoid function," Farlex Inc. (2004), available at http://encyclopedia.thefreedictionary.com/sigmoid%function, 2 pages.
TheFreeDictionary.com website entitled, "Genetic algorithm," Farlex Inc. (2004), available at http://encyclopedia.thefreedictionary.com/genetic%20algorithm, 6 pages.
TheFreeDictionary.com website entitled, "Neuroevolution," Farlex Inc. (2004), available at http://encyclopedia.thefreedictionary.com/Neuroevolution, 2 pages.
TheFreeDictionary.com website entitled, "Pattern recognition," Farlex Inc. (2004), available at http://encyclopedia.thefreedictionary.com/Pattern%20recognition, 3 pages.
Facial Recognition Overview, Imagis Technologies Inc. (2004), available at http://www.imagistechnologies.com/Products/FaceRecognition/, 1 page.
Data Sheet entitled, "Motion Image Separation Technology," NetWatch® Mist® (undated), 2 pages.
Motion Image Separation Technology, NetWatch® MIST (printed Feb. 9, 2005), available at http://www.ar-t.co.uk/mist_data.html, 2 pages.
Machine Vision Technology, Neven Vision (2003-2004), available at http://www.nevenvision.com/technology, 10 pages.
Press Release, "Mobile Identifier Facial Recognition System Successfully Deployed by LAPD to Improve Neighborhood Safety," Neven Vision Inc. (Feb. 7, 2005), 2 pages.
Partek website entitled, "Turning Data into Discovery," (2004), available at http://www.partek.com/, 1 page.
Soongsathitanon et al., "A New Orthogonal Logarithmic Search Algorithm for Fixed Block-Based Motion Estimation for Video Coding," date unknown.

Software and Hardware for Data Analysis Pattern Recognition and Image Processing, The Pattern Recognition Files, maintained by Ela Pekalska (Jan. 24, 2004), available at http://www.ph.tn/tudelft.nl/PRInfo/software.html, 5 pages.

Atienza et al.; "A Practical Zoom Camera Calibration Technique: An Application on Active Vision for Human-Robot Interaction"; Research School of Information Sciences and Engineering, The Australian National University, Canberra ACT 0200 Australia; (2001); 6 pages.

"Eyegaze Analysis System"; LC Technologies, Inc.; http://www.eyegaze.com/2Products/Development/Developmentmain.htm; 2003; 9 pages.

"Gaze Point Detection"; http://wwwsyseng.rsise.anu.edu.au/rsl/hrintact/gazepoint.html; Oct. 24, 1997; 2 pages.

Kawato et al.; "Detection and Tracking of Eyes for Gaze-camera Control"; ATR Media Information Science Laboratories; (2002); 6 pages.

Kim et al.; "Intelligent Process Control Via Gaze Detection Technology"; Aug. 3, 1999; 1 page.

Kurniawan et al.; "Design and User Evaluation of a Joystick-operated Full-screen Magnifier"; Conference on Human Factors in Computing Systems, Proceedings of the Conference on Human Factors in Computing Systems; 2003, 4 pages.

Magee et al.; "EyeKeys: A Real-Time Vision Interface Based on Gaze Detection from a Low-grade Video Camera"; IEEE; 2004; 8 pages.

Perez et al.; "A Precise Eye-Gaze Detection and Tracking System"; Departamento de Artiquitectura y Tecnologia de Sistemas Informáticos (Department of Architecture and Technology of Systems Information)(DATSI); Feb. 2003, 4 pages.

"Quick Glance 1"; Eye Tech Digital Systems; http:www.eyetechds.com/qglance1.htm; (date unknown); 2 pages.

"Blind Source Separation of recorded speech and music signals", available at http://www.cnl.salk.edu/~tewon/Blind/blind_audio.html, printed Dec. 29, 2004.

"Nokia 6100 Cellular Phones", available at http://www.mediaplace.nl/nokia-6100-cellular-pho..., website updated Dec. 9, 2004, pp. 1-4.

"Student Voicemail Information", University of Saint Francis, available at http://www.sf.edu/computing/voicemail.shtml, website updated Feb. 10, 2005, pp. 1-3.

Kawato et al., Image and Vision Computing, "Detection and Tracking of Eyes for Gaze-camera Control," 22(12):1031-1038, Mar. 2004.

LMS, Blind Source Separation, 4 pages at http://www.Int.de/LMS/research/projects/BSS/index.php?lang=eng, printed Dec. 29, 2004.

Rickard, "Blind Source Separation", available at http://eleceng.ucd.ie/~srickard/bss.html, last modified Jul. 2, 2004, pp. 1-3.

TheFreeDictionary.com website entitled, "Image analysis," Farlex Inc., printed Jul. 7, 2008, available at http://encyclopedia.thefreedictionary.com/image%20analysis, pp. 1-3.

Background of the Invention for the above-captioned application (previously provided).

Shih; Assessing Bailenson, et al's "Transformed social interaction: Decoupling representation from behavior and form in collaborative virtual environments"; http://www.stanford.edu/class/symbsys205/jshih_final.html; printed Mar. 8, 2006; 3 pages.

Answers.com; Internet printout from http://www.answers.com/topic/face-perception; printed Mar. 8, 2006; 8 pages.

Eigenface; Internet printout from http://en.wikipedia.org/wiki/Eigenface; printed Mar. 8, 2006; 2 pages.

Internet printout from http://72.14.207.104/search?q=cache:QVgZLtYu_efJ:www-cse.ucsd.edu/users/gary/pubs/padgett_cogsci96.ps+%22Eigen+face...; printed Mar. 8, 2006; 10 pages.

Edwards et al.; "Interpreting Face Images Using Active Appearance Models"; html version of the file http://www.ai.mit.edu/courses/6.899/papers/aamFG98.pdf; printed Mar. 8, 2006; 11 pages.

"FRANN: Face Recognition Using Artificial Neural Network" html version of the file http://www.ece.stevens-tech.edu/ds/archie/03F-04S/deliverables/grp19/Fall_Proposal.pdf; printed Mar. 8, 2006; 43 pages.

Internet printout from http://download.rol.ro/dhtml/magic_morph_195.htm; printed Mar. 8, 2006; 2 pages.

Bailenson et al.; "Transformed Facial Similarity as a Political Cue: A Preliminary Investigation"; In Press, *Political Psychology*; Department of Communication, Stanford University; 22 pages.

U.S. Appl. No. 11/080,763, filed Mar. 14, 2005, Coughlan et al.
U.S. Appl. No. 11/109,970, filed Apr. 19, 2005, Chan et al.
U.S. Appl. No. 11/129,124, filed May 13, 2005, Coughlan et al.

* cited by examiner

EXPLOITING FACIAL CHARACTERISTICS FOR IMPROVED AGENT SELECTION

CROSS REFERENCE TO RELATED APPLICATION

The present application claims the benefits under 35 U.S.C. §119(e) of U.S. Provisional Application Ser. No. 60/808,910, of the same title, filed May 25, 2006, to Coughlan et al., which is incorporated herein by reference in its entirety.

FIELD OF THE INVENTION

The invention relates generally to contact centers and particularly to the servicing of video-enabled customer contacts by a contact center.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IRU) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

In contact centers, video-capable multi-media contacts are becoming more frequent. Packet-switched protocols now permit users to inexpensively acquire and use equipment providing real-time or full motion video images of themselves to other parties. The equipment is normally a video card, a digital camera or camcorder, and open source software.

Despite the advent of video telecommunications, many contact centers are continuing to route contacts to agents using non-video specific criteria, such as customer identity, customer value, wait time, agent availability, agent skills, and the like. The additional information provided by the video channel of the contact is largely ignored.

SUMMARY OF THE INVENTION

These and other needs are addressed by the various embodiments and configurations of the present invention. The present invention is directed to the use of video information in assigning and servicing incoming and outgoing contacts.

In one embodiment of the present invention, a method is provided that includes the steps:

(a) providing a first (inbound or outbound) video-capable contact for servicing by a contact center resource, the contact corresponding to a first customer; and (b) performing at least one of the following steps:

(i) based on facial features of the first customer, selecting an avatar from among a number of avatars to display to the first customer while the first customer is serviced;

(ii) based on facial features of the first customer, selecting an agent from among a number of agents to service the first customer (the selected agent's face being displayed to the first customer while the first customer is serviced);

(iii) altering one or more facial features of an avatar to produce a morphed set of avatar facial features to display to the first customer while the first customer is serviced, the morphed set of avatar facial features being, at least in part, a function of the facial features of the first customer; and (iv) altering one or more facial features of a selected agent to produce a morphed set of agent facial features to display to the first customer while the first customer is serviced by the selected agent, the morphed set of agent facial features being, at least in part, a function of the facial features of the first customer.

This embodiment can increase the overall effectiveness of video-capable contact centers. In such contact centers, video streams are used in addition to the audio signal (e.g., video telephony). The ability of agents to influence callers can be a key determinant of business effectiveness. An important factor in realizing such influence is widely considered to be effective agent selection. Using customer facial features in agent and avatar selection and/or presentation can profoundly impact agent influence. Research in social psychology has demonstrated large-scale effects of facial similarity on social influence. An individual judged to be more similar to a given person (compared to a less similar individual) is considered by that person to be more attractive, persuasive, and more likely to elicit altruistic behavior. It has further been demonstrated that individuals treat digital avatars that look like themselves more intimately than avatars that look like others. There is thus a high correlation between the degree of similarity of visual appearance of a person's face and their ability to influence another individual. The use of this feature in video contact centers can further provide a more favorable first impression to new customers.

In yet a further embodiment, a method for servicing customer contacts in a contact center is provided that includes the steps of:

(a) providing a first (inbound or outbound) video-capable contact for servicing by a contact center resource, the contact corresponding to a first customer; and (b) as part of servicing the first customer, providing, for display, an avatar to the first customer's communication device, the behavior and/or movements of the displayed avatar being a function of a behavior and/or movement of the first customer.

This embodiment, like the prior embodiment, can have a substantial, positive impact on contact center effectiveness and profitability. Studies have shown that, when an experimenter that is represented as a digital avatar in a virtual environment subtly mimics the behaviors and movements of a participant (who may also be expressed as an avatar in the environment) regardless of the degree of similarity in physical appearance, the participant is more likely to say that they liked the experimenter more and that smoother conversation occurred during the interaction. Studies have further shown that human-to-human communications is strongly affected by maintaining mutual eye gaze. The movement of the avatar, which may be a representation of a human agent (such as the agent assigned to service the customer), may be customized for the particular customer. The customization may be in the form not only of unusual behavior patterns or movements of the customer but also of normal movements of the customer. An example of normal movements would include the avatar looking at the customer when the customer looks at the avatar (to maintain eye contact), and the avatar looking away from the customer when the customer looks away from the avatar. In video telephony, maintaining eye contact or gaze can be difficult because the customer and agent each can choose to look at the screen or the camera at different time.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
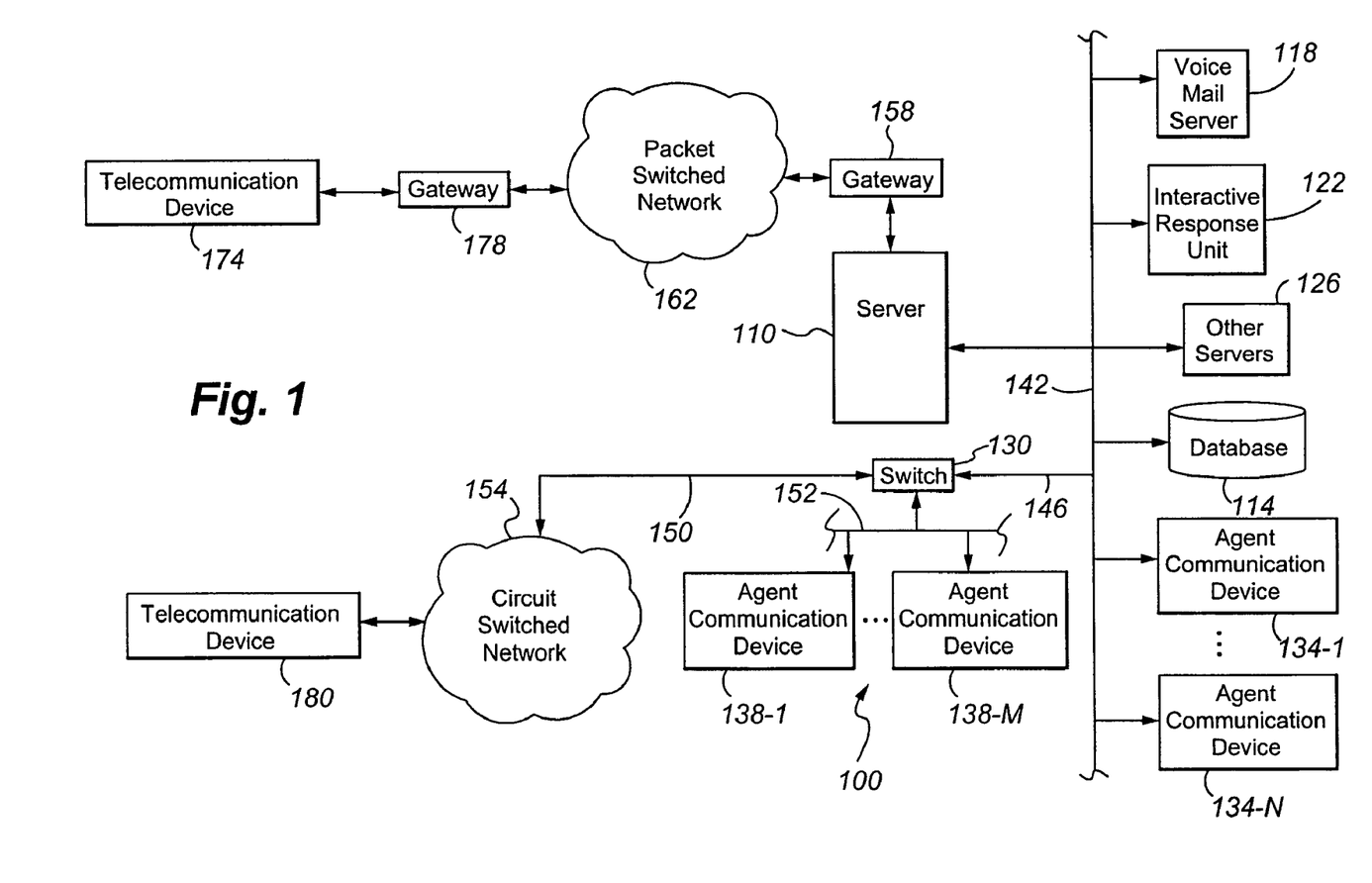
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IRU 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Communication Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
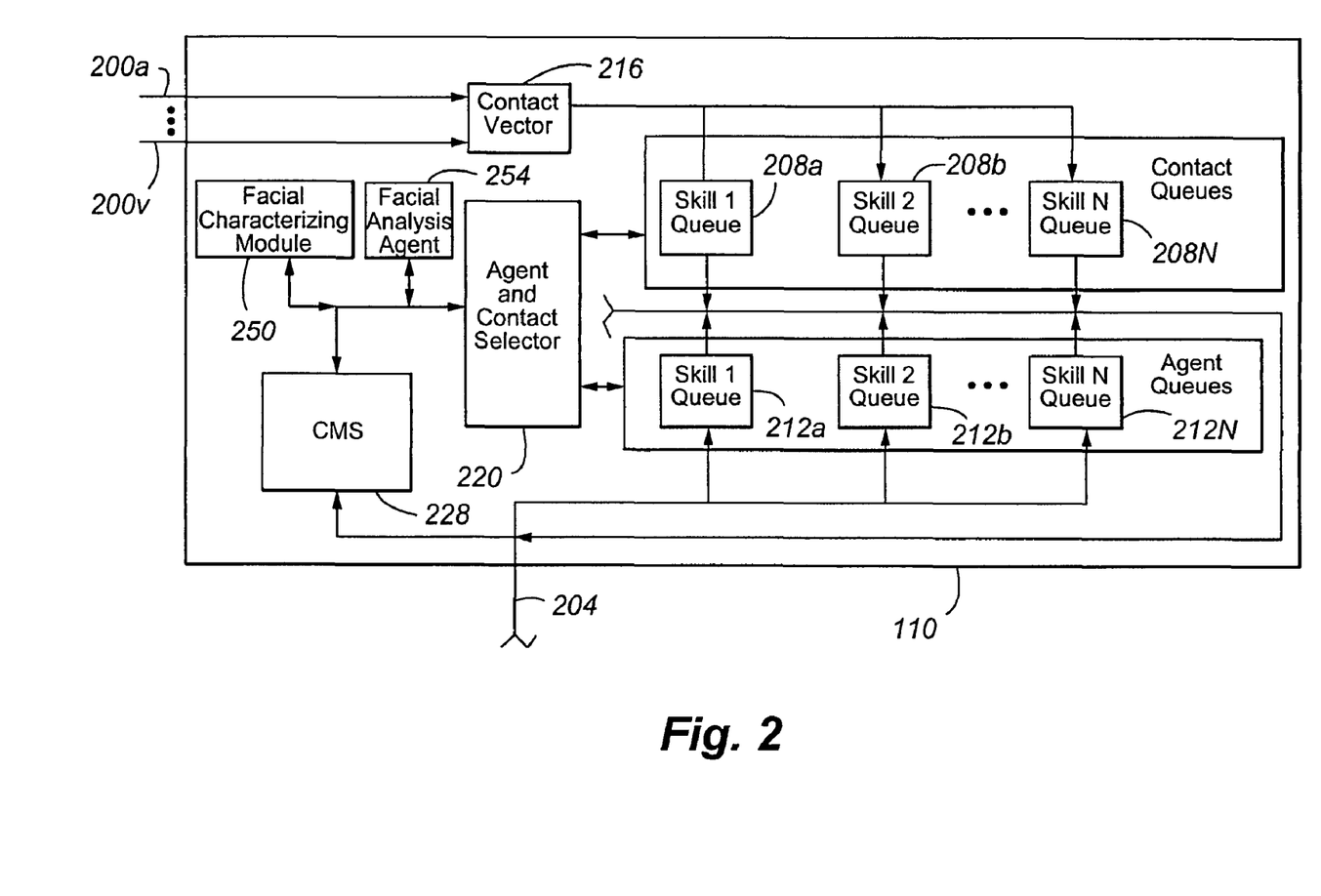
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 152). The server 110 can include a Basic Call Management System™ or BCMS and a Call Management System™ or CMS 228 that gathers call records and contact-center statistics for use in generating contact-center reports. CMS and BCMS and any other reporting system, such as Operational Analyst™ will hereinafter be referred to jointly as CMS 228.

The switch 130 and/or server 110 can be any architecture for directing contacts to one or more communication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™ Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

Referring to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208*a-n* based upon a number of predetermined criteria, including customer identity, customer needs, contact center needs, current contact center queue lengths, customer value, similarity of the customer's facial characteristics to the agent's facial characteristics, and the agent skill that is required for the proper handling of the contact. Agents who are available for handling contacts are assigned to agent queues 212*a-n* based upon the skills that they possess. An agent may have multiple skills, and hence may be assigned to multiple agent queues 212*a-n* simultaneously. Furthermore, an agent may have different levels of skill expertise (e.g., skill levels 1-N in one configuration or merely primary skills and secondary skills in another configuration), and hence may be assigned to different agent queues 212*a-n* at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be any suitable gateway, such as Avaya Inc.'s, G700 Media Gateway™, and may be implemented as hardware such as via an adjunct processor (as shown) or as a chip in the server.

The first communication devices 134-1, . . . 134-N are packet-switched while the second communication devices 138-1, . . . 138-M are circuit-switched. The packet-switched communication devices can use a variety of interactive real time communication applications, such as Voice over IP or VoIP, instant messaging, chat, text messaging, and the like. The packet-switched devices typically include wired and wireless IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts. Preferably, at least some of the first communication devices 134-1 . . . N and customer telecommunication device 174 are video-capable. In other words the devices can send for display and/or receive and display video images. The second communication devices can be any live voice communication devices and generally include Time Division Multiplexed (TDM) wired and wireless telephones, PDAs, H.320 video phones and conferencing units, voice messaging and response units, and traditional computer telephony adjuncts.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" or "customer communication devices" and are not directly supported as communication device endpoints by the switch or server. The communication devices 174 and 180 are thus external endpoints as opposed to the agent communication devices which are internal endpoints.

The Interactive Response Unit or IRU 122 is preferably a video-capable, automated multi-media response unit. In other words, the IRU 122 can provide display for an animated avatar to the customer via the customer's video-capable communication device. As will be appreciated, an IRU refers to an automated contact center resource that interactively interfaces or communicates with a customer, and an "avatar" is a graphical icon or computer generated image that represents a real person such as in a virtual reality system. The avatar may appear to be a real person and may have the appearance of the human agent selected to service the contact. The avatar may have any set of body parts generated, in whole or part, using corresponding body parts of a human agent, such as eyes, nose, hair, face, hands, arms, and the like. An example of a type of IRU in the voice domain is an Interactive Voice Response Unit or IVR.

In a preferred embodiment, the avatar's appearance is based on the facial and/or other physical characteristics of the selected customer to whom the avatar is displayed. More preferably, the avatar is a human-like graphical icon having facial characteristics that are a function of and having some similarity to the facial characteristics of the selected customer. The avatar may be in the form of a number of avatar files, each possessing differing facial characteristics. As will be appreciated, facial characteristics are a function of potentially unique facial features, such as eye size and shape, nose size and shape, mouth size and shape, lip size and shape, hair color, hair style, hair or scalp line location and shape, ear size and shape, facial hair shape (if any), and the relative positions of any of the foregoing features, e.g., relative positions or spacing of eyes, relative positions of nose and eyes, relative positions of nose and mouth, relative positions of ears, and the like. In one configuration, a plurality of avatars are used for each sex; that is, the members of a set of female avatars each have unique facial characteristics and the members of a set of male avatars each have unique facial characteristics.

The database 114 can include a variety of information associated with the contact center and its customers. Preferably, the database 114 includes agent and customer profiles. The agent profiles include information such as agent identity, agent skills, agent skill levels, and agent facial characteristics. The customer profiles include, for a given customer, customer identity, customer personal information (including telephone number(s) and other electronic address(es)), customer financial information, customer transaction history with the contact center, customer value, customer facial characteristics, and the like. As will be appreciated, the contact center may include a call data collector (not shown) to collect caller information, such as Automatic Number Identification (ANI) information, caller-ID information, and/or Dialed Number Information Service (DNIS) information.

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the component to forward or route the contact to a specific contact center resource, such as the IRU unit 122, the voice mail server 118, and/or first or second communication device 134, 138 associated with a selected agent. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110.

Figure 3:
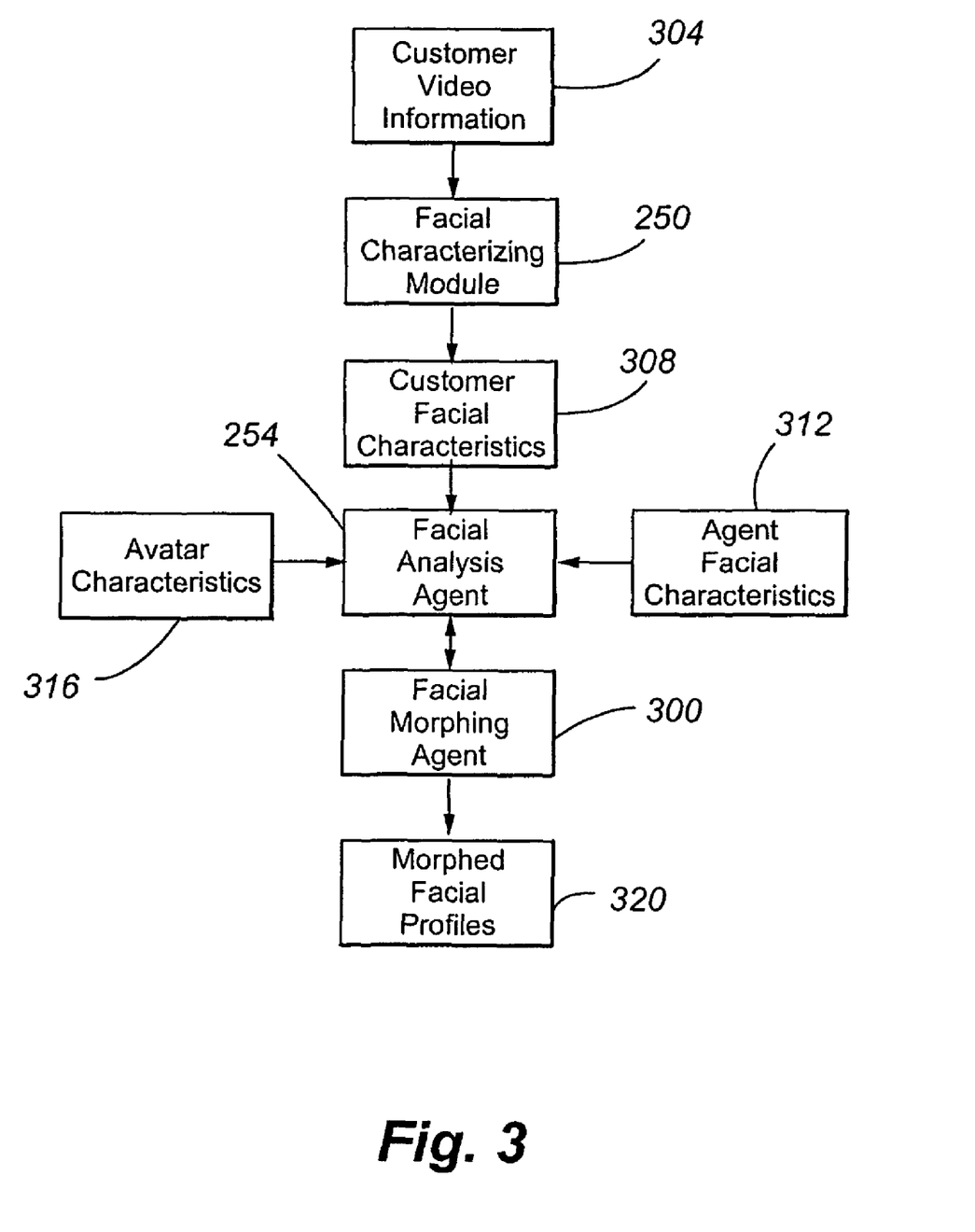
FIG. 3 is a block diagram of a logic architecture according to an embodiment of the present invention.

With reference to FIGS. 2-3, a facial characterizing module 250, analysis agent 254, and morphing agent 300 are provided. The modules are stored either in the main memory or in a peripheral memory (e.g., disk, CD ROM, etc.) or some other computer-readable medium of the center 100.

The facial characterizing module 250 converts digital video images, such as JPEG information received from an imaging device, such as a camera or camcorder, and, for customers, customer video information 304 that is part of a video-capable communication, to facial characteristics, such as agent or customer facial characteristics 312 and 308, respectively. In other words, the module 250 maps the digital video image to a set of parametric values describing the image.

The module 250 may be implemented in many ways. Most face extraction algorithms are in one of two groups, namely feature-based and image-based algorithms. Feature-based methods explore a set of geometric features, such as the distance between the eyes or the size of the eyes, and use these measures to represent the face. Image-based systems map the facial features into a multi-dimensional face space.

Image-based systems are normally based on eigenfaces or eigenimages, which generally use two-dimensional, global grayscale images representing distinctive characteristics of a facial image. As will be appreciated, eigenfaces are a set of eigenvectors used for computer recognition of human faces. Eigenvectors are derived from the covariance matrix of the probability distribution of the high-dimensional vector space of possible faces of human beings. Any human face can be considered to be a combination of these standard faces. One person's face might be made up of 10% of a first face, 25% of a second face, 20% of a third face, and so on. This permits computers to record someone's face using far less space than would be taken up by a digitized photograph. Eigenfaces are generated using a large set of digitized images of human faces, taken under the same lighting conditions and normalized to line up the eyes and mouths. They are then sampled at the same pixel resolution (e.g., m×n) and subsequently treated as mn-dimensional vectors whose components are the values of their pixels. The eigenvectors of the covariance matrix of the statistical distribution of face image vectors are then extracted. When properly weighted, eigenfaces can be summed together to create an approximate gray-scale rendering of a human face. Variants using eigenfaces include parametric model-based approaches, such as the Active Shape Model.

A neural network may be used to characterize the features of the selected face. Neural networks imitate the way a human brain works. Artificial neural networks are composed of neurons connected through synapses or weights. Each neuron performs a simple calculation that is a function of the activations of the neurons assigned to it. Through feedback mechanisms and/or the nonlinear output response of neurons, the network is capable of performing extremely complicated tasks. Examples of neural network types include the perceptron, the linear associator, and the neocognition. Four main steps are used by the network, namely sample capture, feature extraction, template construction, and matching.

The facial characteristics are, of course, a function of the particular implementation of the module 250 and may be a function of gender. In the case of feature-based algorithms, facial characteristics commonly include a facial map or mapping of facial features. A typical facial map will have from about twenty to about one-hundred key data points. The data points describe the location and/or configuration of one or more corresponding facial features, e.g., the sizes and spatial positions of the eyes, nose, ears, mouth, and the like. In the case of image-based algorithms, facial characteristics commonly include a set of eigenfaces or eigenimages that, when summed together, create a rendering of the human face to which the facial characteristics correspond. The set of eigenfaces or eigenimages may include one or more members, each member corresponding to a different eigenface or eigenimage.

The facial analysis agent 254 is optional and compares the customer facial characteristics 308 (such as a set or combination of eigenfaces that reproduce the corresponding customer's facial features) against the facial characteristics of the various human agents available to service the customer and/or the facial characteristics of each of the avatars. As in the case of the customer facial characteristics, the agent and avatar facial characteristics 312 and 316, respectively, are commonly expressed as the set or combination of eigenfaces that reproduces the corresponding agent's or avatar's facial features. The comparison can use, for example, the comparison algorithms currently used by face recognition systems, which digitize faces and match them against a face database to determine, for example, whether a person is authorized to enter a facility or use a system. When the comparison is performed, each of the comparisons has an associated probability or degree of similarity. The comparison having the highest degree of similarity is identified by the facial analysis agent 254 as the best match.

The facial morphing agent 300 is also optional and uses the customer facial characteristics 308 and the characteristics of the selected agent or avatar to form a morphed facial profile or image 320 that resembles more closely (or is a better match for) the facial features of the customer to be serviced by the selected agent or avatar. The morphed facial image 320, in lieu of the selected agent's or avatar's unaltered facial image, is provided to the customer during the session. The morphed facial images can be produced by a number of known techniques. For example, the morphed images may be generated using Magic Morph™. The facial morphing agent normally blends the facial images of the customer and selected agent or avatar to form the morphed facial image provided to the customer's video-capable communication device. Preferably, no more than about 40% and even more preferably from about 10 to about 40% of the morphed image is derived from the customer's facial image, with the remainder being derived from the selected agent's or avatar's facial image. A percentage greater than 40% would normally be perceptible by the customer as being a morphed image. Because males tend to be more positively influenced by morphed images than females, the facial morphing agent, in one configuration, provides morphed images only for male customers and not for female customers.

In one configuration, the avatar not only is selected to have a similar appearance to the customer but is also controlled to have similar behaviors and/or movements to the customer. For example, the avatar's behavior and/or movement can mimic the behaviors and movements of the customer. "Behavior" refers to a physical behavior or set of movements, such as a facial expression, a hand gesture, a head, arm, hand, or wrist movement, and eye movement. The behavior may a real-time movement so that the avatar tracks the current movements of the customer or an unusual, characteristic, or habitual movement of the customer (e.g., a nervous tick, an unusual facial expression or hand movement, and the like). In the latter case, the movement will typically be asynchronous with the customer's movement.

The configuration can be implemented in a number of ways. In one implementation, a human views the full motion video of the customer and selects behaviors/movements from a plurality of possible coded behaviors/movements as being used by the customer. The codes of the selected behaviors/movements are stored in association with the customer's identity. When the customer is assigned to an avatar, the applicable codes would be provided to the avatar controller, which would randomly, pseudorandomly, or sequentially select one or more codes for avatar movement during selected time intervals. In another implementation, known automated techniques capture, extract, and characterize the customer's movements. Behavior may be characterized by recording the frequency of different movements and recurring sequences of multiple movements. This implementation can be performed in real time so that the avatar can mimic relatively contemporaneously the customer's movements. As in the case of the prior implementation, the characterized behavior/movement information can be used to control avatar movement. In one implementation, a modifying factor, e.g., mimic X % of the behaviors, is used to dampen the degree of similarity between tracked and tracking behavior.

Figure 4:
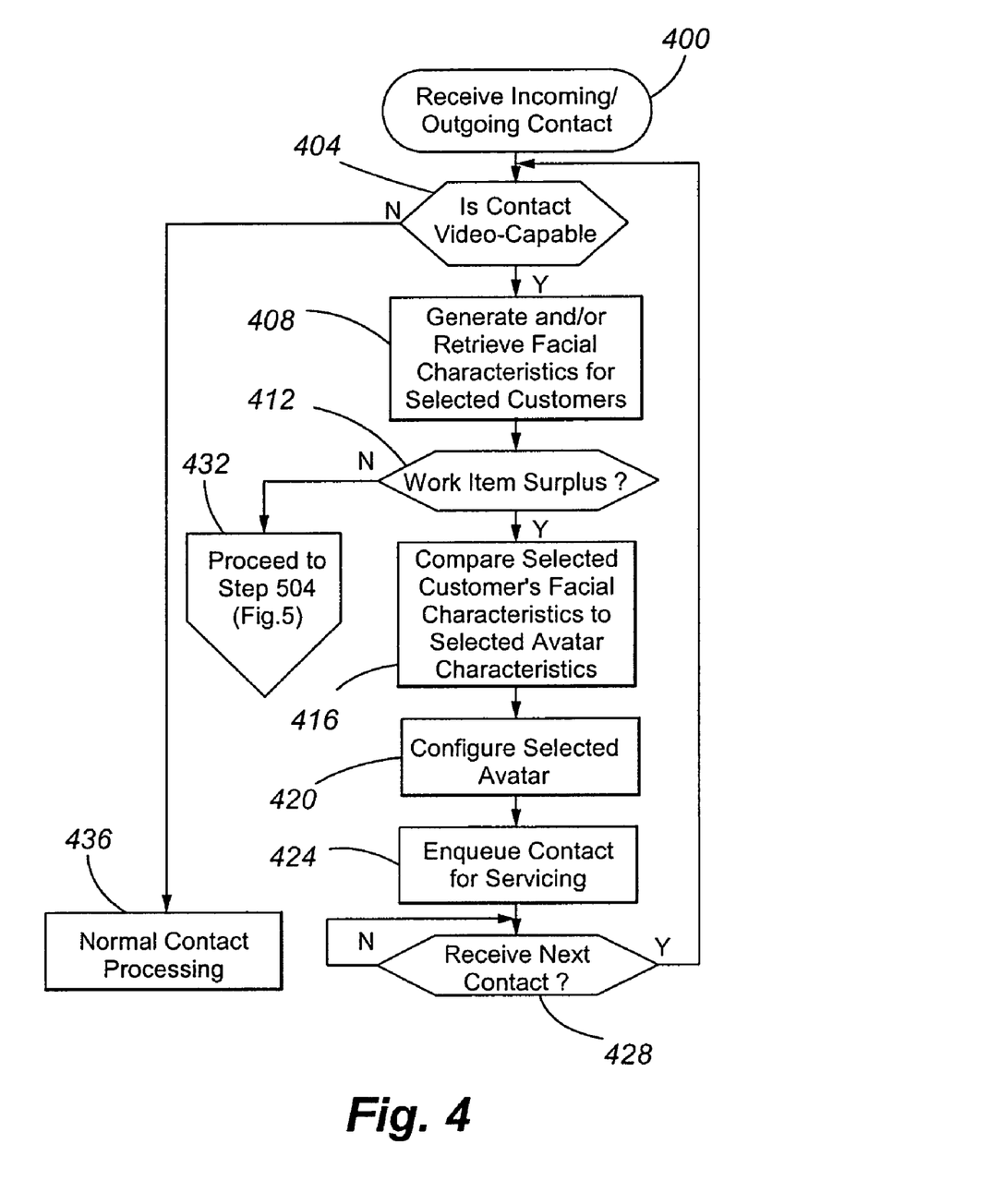
FIG. 4 is a flow chart showing an operational embodiment according to the present invention.

FIG. 4 depicts a first operational mode of the architecture of the present invention.

The algorithm commences when an incoming or outgoing customer contact is received in oval 400.

In decision diamond 404, the server first determines whether the contact is video-capable. In other words, the server determines whether the contact will have a video channel in addition to an audio and/or text channel. The video channel may be a still image or a full motion video image. When the contact is not video-capable, the server performs normal contact processing in step 436.

When the contact is video-capable, the facial characterizing module 250 generates from the incoming customer-video information 304 and/or retrieves from storage customer facial characteristics 308 for the [selected] customer corresponding to the selected contact.

In decision diamond 412, the agent and contact selector 220 determines whether or not the contact center and/or corresponding work item queue is in a surplus work item state. If not, the server proceeds to step 504 in FIG. 5 (discussed below). In this step, the contact center may determine the gender of the contactor to facilitate generation of the facial characteristics.

When the contact center and/or corresponding queue is in a surplus work item state, the facial analysis agent 254 optionally compares the selected customer's facial characteristics to the facial characteristics of each avatar in the set of avatars maintained by the contact center. The avatar having facial characteristics that most closely resemble the facial characteristics of the selected customer is selected to service the customer. In this step, the gender of the contactor may be used to assist in selection the optimal avatar.

In step 420, the facial morphing agent 300 optionally configures or alters the facial characteristics of the selected avatar to resemble, even more closely, the facial characteristics of the selected customer. As will be appreciated, the facial characteristics of the avatars may be a set of eigenimages that has the appearance of a bland androgynous average human face. This is so because the eigenimages are, as noted, a blend of a number of different person's faces. Each avatar would have a corresponding set of eigenimages. Alternatively, the facial characteristics of the avatars may correspond to distinctly different human faces, each of which corresponds to a face of a selected person. In either case, the facial morphing agent 300 transforms the set of facial characteristics of the selected avatar to produce morphed facial characteristics having a higher degree of similarity to the customer's set of facial characteristics.

In step 424, the contact is enqueued for servicing. While the contact is in queue, the selected avatar is displayed by the IRU unit 122 to the selected customer. As noted, the behaviors/movements of the selected avatar may also be a function of the behaviors/movements of the selected customer.

In decision diamond 428, the server awaits the next contact.

Figure 5:
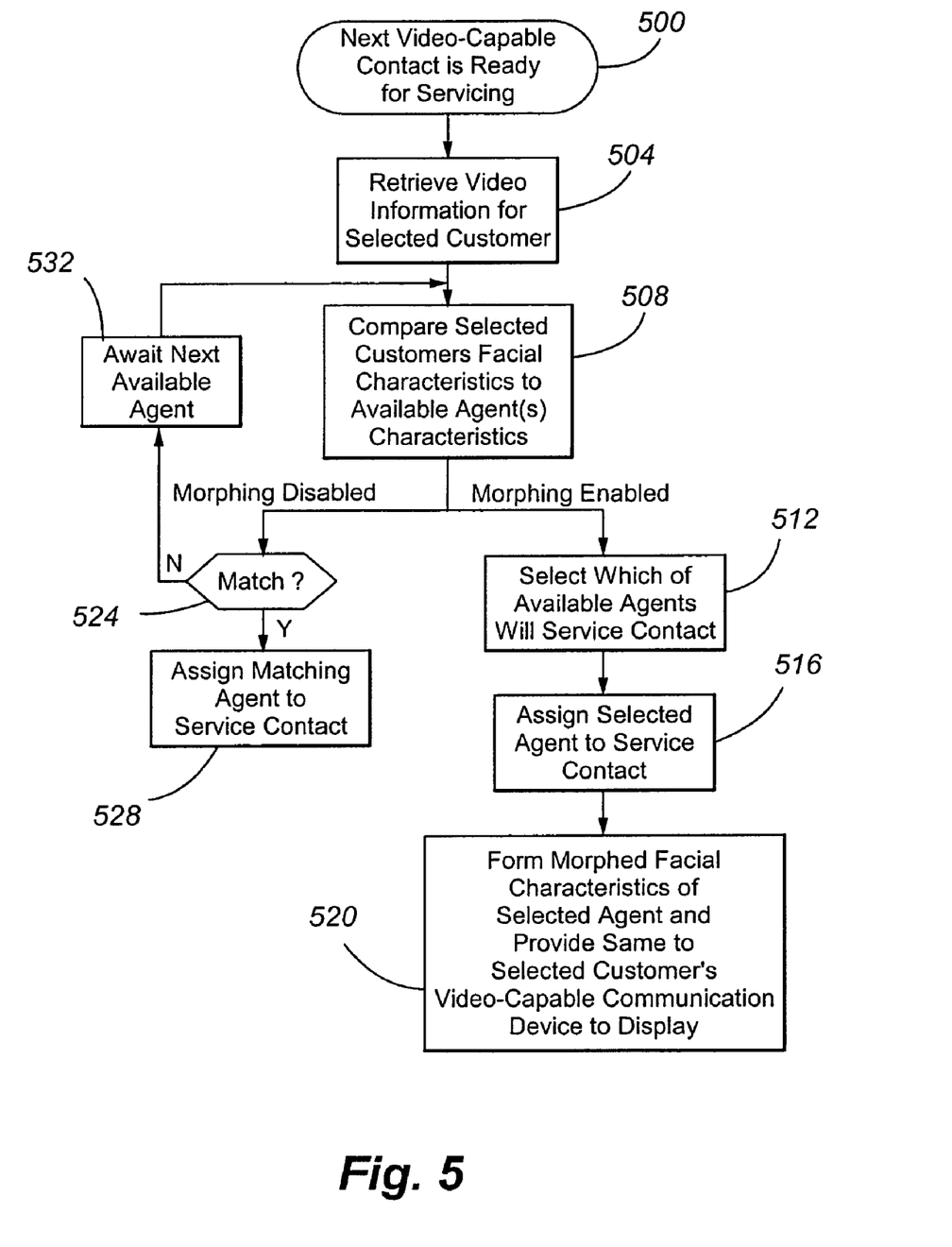
FIG. 5 is a flow chart showing an operational embodiment according to the present invention.

FIG. 5 depicts a second operational mode of the architecture of the present invention.

The algorithm commences when an incoming or outgoing video-enabled customer contact is ready for servicing in oval 500.

In step 504, the facial characterizing module 250 retrieves from storage the video information for the selected customer.

In step 508, the facial analysis agent 254 compares the selected customer's facial characteristics to the sets of facial characteristics corresponding to the available or soon-to-be-available agent(s) to determine which of the agents most closely resembles the customer. In this step, the gender of the contactor may be used to assist in agent selection.

When morphing is enabled, the analysis agent 254, in step 512, selects which of the available agents will service the contact. Oftentimes, the agent having the closest set of facial characteristics to the customer is selected.

In step 516, the selector 220 assigns the selected agent to service the contact.

In step 520, the facial morphing agent forms morphed facial characteristics 320 of the selected agent and provides the morphed facial characteristics to the server for display to the customer by the customer's video-capable communication device.

When morphing is disabled, the facial analysis agent 254 determines, in decision diamond 524, whether there is an available agent, or soon-to-be-available agent, having a set of facial characteristics that has at least a selected degree of similarity to the facial characteristics of the customer. In one configuration, the degree of similarity is a function of the probability that the selected agent's set of facial characteristics corresponds to the same person as the customer's set of facial characteristics. This is a similar determination, in the configuration, to that made by a face recognition authentication system.

When an agent is found that has at least the required degree of facial similarity to the customer, the selector 220, in step 528, assigns the agent to service the customer.

When an agent is not found that has at least the required degree of facial similarity to the customer, the selector 220, in step 532, awaits a different agent to become available and repeats step 508.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing customer contacts in a contact center, comprising:
   providing at least a first video-capable contact for servicing by a contact center resource, the contact corresponding to a first customer; and
   based, at least in part, on facial features of the first customer, selecting an agent from among a plurality of agents to service the first customer, the selected agent's face, or an avatar corresponding thereto, having similar facial features to the facial features of the first customer and being displayed to the first customer while the first customer is serviced, the agent selection at least based on a query to a database, the database including agent facial characteristics for the plurality of agents in the contact center, wherein at least one facial feature of the selected agent resembles more closely a corresponding at least one facial feature of the first customer than a corresponding at least one facial feature of an unselected agent.

2. The method of claim 1, further comprising:
   identifying at least one of a behavior and a movement of the first customer; and
   replicating, at least in part, the identified at least one of behavior and movement in a corresponding at least one of a behavior and movement in an avatar displayed to the first customer while the customer is being serviced.

3. The method of claim 1, wherein the first customer is serviced by an avatar, wherein the avatar is displayed to the first customer during servicing, and wherein at least one of a behavior and movement of the displayed avatar is a function of a corresponding at least one of a behavior and movement of the first customer.

4. A non-transitory computer readable medium comprising processor-executable instructions to perform the steps of claim 1.

5. A method for servicing customer contacts in a contact center, comprising:
   providing at least a first video-capable contact for servicing by a contact center resource, the contact corresponding to a first customer; and
   as part of servicing the first customer, providing, for display, an avatar to the first customer's communication device, wherein at least one of a behavior and movement of the displayed avatar is a function of a corresponding at least one of a behavior and movement of the first customer, wherein the at least one of the behavior and movement of the displayed avatar is automatically detected and includes the avatar mimicking maintaining of eye contact, wherein the behavior is modified by a modifying factor, the modifying factor dampening a degree of similarity between tracked and tracking behavior and, selecting an agent from among a plurality of agents to service the first customer, the selected agent's face, or the avatar corresponding thereto, having similar features to the facial features of the first customer and being displayed to the first customer while the first customer is serviced, the agent selection at least based on a query to a database, the database including agent facial characteristics for a plurality of agents in the contact center.

6. The method of claim 5, further comprising:
   based, at least in part, on facial features of the first customer, selecting the avatar from among a plurality of avatars to display to the first customer while the first customer is serviced.

7. The method of claim 5, further comprising:
   altering at least one facial feature of the avatar to produce a morphed set of avatar facial features to display to the first customer while the first customer is serviced, the morphed set of avatar facial features being, at least in part, a function of the facial features of the first customer.

8. A non-transitory computer readable medium comprising processor-executable instructions to perform the steps of claim 5.

9. A contact center, comprising:
   a plurality of human agents to service customer contacts;

an Interactive Response Unit (IRU) operable to display an avatar to a customer's video-capable communication device; and a server operable to:
provide at least a first contact from a first customer; and
based, at least in part, on facial features of the first customer, select a human agent from among a plurality of human agents to service the first customer, the selected human agent's face, or an avatar corresponding thereto, having similar facial features to the facial features of the first customer and being displayed to the first customer while the first customer is serviced, the human agent selection at least based on a query to a database, the database including agent facial characteristics for the plurality of human agents in the contact center,
wherein at least one facial feature of the selected agent resembles more closely a corresponding at least one facial feature of the first customer than a corresponding at least one facial feature of an unselected agent.

10. The contact center of claim 9, wherein the server is operable to:
identify at least one of a behavior and a movement of the first customer; and
replicate the identified at least one of behavior and movement in a corresponding at least one of a behavior and movement in an avatar displayed to the first customer while the customer is being serviced.

11. The contact center of claim 9, wherein the first customer is serviced by an avatar, wherein the avatar is displayed to the first customer during servicing, and wherein at least one of a behavior and movement of the displayed avatar is a function of a corresponding at least one of a behavior and movement of the first customer.

* * * * *